(12) United States Patent
Wanami (10) Patent No.: US 9,254,804 B2
(45) Date of Patent: Feb. 9, 2016

(54) IMPACT-INJURY PREDICTING SYSTEM

(71) Applicant: DENSO CORPORATION, Kariya, Aichi-pref. (JP)

(72) Inventor: Shingo Wanami, Kariya (JP)

(73) Assignee: DENSO CORPORATION, Kariya, Aichi-pref.

(*) Notice: Subject to any disclaimer, the term of this patent is extended or adjusted under 35 U.S.C. 154(b) by 64 days.

(21) Appl. No.: 14/157,637

(22) Filed: Jan. 17, 2014

(65) Prior Publication Data

US 2014/0207341 A1 Jul. 24, 2014

(30) Foreign Application Priority Data

Jan. 22, 2013 (JP) .................. 2013-009406

(51) Int. Cl.
*B60R 21/00* (2006.01)
*B60R 21/0136* (2006.01)
*G06K 9/00* (2006.01)
*G06T 7/20* (2006.01)
*B60R 21/0134* (2006.01)

(52) U.S. Cl.
CPC ......... *B60R 21/0136* (2013.01); *B60R 21/0134* (2013.01); *G06K 9/00362* (2013.01); *G06K 9/00805* (2013.01); *G06T 7/20* (2013.01)

(58) Field of Classification Search
CPC .... B60R 21/34; B60R 21/0134; B60R 21/38; B60R 21/0136; B60R 21/36; B60R 2021/343; B60R 2019/1886; B60R 2021/003; B60R 2021/346; B60R 21/0132; B60R 2021/23324; B60R 21/01; B60R 21/015; B60R 21/08; B60R 21/26; B60R 2300/301; B60R 2300/302; G08G 1/166; G08G 1/165; G08G 1/163

USPC .......... 701/3, 45, 46, 31.4, 96, 301; 180/68.4, 180/69.21, 271, 274, 282
See application file for complete search history.

(56) References Cited

U.S. PATENT DOCUMENTS

| | | | |
|---|---|---|---|
| 6,327,536 B1* | 12/2001 | Tsuji et al. ..................... | 701/301 |
| 7,330,568 B2* | 2/2008 | Nagaoka et al. ............... | 382/104 |
| 8,648,912 B2* | 2/2014 | Matsuda et al. ............... | 348/148 |
| 8,655,579 B2* | 2/2014 | Sakugawa et al. ............ | 701/301 |
| 8,798,867 B2* | 8/2014 | Stoll et al. ........................ | 701/45 |
| 8,876,157 B2* | 11/2014 | Nilsson et al. ................. | 280/735 |
| 8,949,018 B2* | 2/2015 | Kaminade ...................... | 701/301 |
| 2005/0269805 A1* | 12/2005 | Kalliske et al. ............. | 280/730.1 |

(Continued)

FOREIGN PATENT DOCUMENTS

JP 2010-244167 10/2010

*Primary Examiner* — Truc M Do
(74) *Attorney, Agent, or Firm* — Harness, Dickey & Pierce, P.L.C.

(57) ABSTRACT

A first-collision predicting part determines if a possibility of a first collision, which happens between a human and a vehicle, is higher than a predetermined threshold. A first-collision-situation determining part determines a position of a head of the human and a relative speed of the head relative to the vehicle at a time of the first collision, when the first-collision predicting part determines the possibility of the first collision is higher than the predetermined threshold. A second-collision-situation estimating part estimates a collision situation of the head in a second collision, based on a determining result of the first-collision-situation determining part. An injury-degree predicting part predicts a degree of injury of the head based on an estimation result of the second-collision-situation estimating part.

13 Claims, 6 Drawing Sheets

(56) References Cited

U.S. PATENT DOCUMENTS

| | | | |
|---|---|---|---|
| 2006/0213714 A1* | 9/2006 | Igawa | 180/274 |
| 2007/0112513 A1* | 5/2007 | Mathevon et al. | 701/301 |
| 2008/0036576 A1* | 2/2008 | Stein et al. | 340/425.5 |
| 2008/0097699 A1* | 4/2008 | Ono | 701/300 |
| 2009/0143987 A1* | 6/2009 | Bect et al. | 701/301 |
| 2011/0125372 A1* | 5/2011 | Ito | 701/45 |
| 2012/0300078 A1* | 11/2012 | Ogata et al. | 348/148 |

\* cited by examiner

IMPACT-INJURY PREDICTING SYSTEM

CROSS REFERENCE TO RELATED APPLICATION

This application is based on Japanese Patent Application No. 2013-9406 filed on Jan. 22, 2013, the disclosure of which is incorporated herein by reference in its entirety.

TECHNICAL FIELD

The present disclosure relates to an impact-injury predicting system.

BACKGROUND

An early rescue of a vulnerable road user (e.g., a pedestrian and a person on a bicycle) when a road accident happens is growing in importance. To respond to a requirement of the early rescue, JP-2010-244167A discloses an emergency report system detecting a collision of a pedestrian with a vehicle, based on an actuation of a pop-up hood. The emergency report system reports collision information, such as a vehicle speed just before the collision happens, an acceleration of a bumper of the vehicle, and collision energy, to a control center. In addition; the emergency report system acquires a front image of the vehicle in a driving direction by using an image sensor and reports if the vehicle collided with a human or with an object.

A first collision of a human with a vehicle induces a second collision of a head of the human with the vehicle or with the ground. Generally, a leg of the human collides with a bumper of the vehicle in the first collision. The second collision often causes a serious or fatal injury. When an institution such as a hospital acquires situation information of the second collision, a rescue effort can be more accurate and prompt. However, the emergency report system of JP-2010-244167A does not predict human injury in considering a collision situation of the second collision. Moreover, it is difficult for the emergency report system to exactly predict a collision situation of a second collision by reason that the more a subject comes closer to the image sensor such as a camera, the more an image (or a movie) taken by the camera becomes unclear.

SUMMARY

It is an objective of the present disclosure to provide an impact-injury predicting system predicting human injury in consideration of a collision situation of a second collision.

To achieve the above objective, there is provided an impact-injury predicting system having an image sensor, a distance sensor, a first-collision predicting part, a first-collision-situation determining part, a second-collision-situation estimating part, and an injury-degree predicting part.

The image sensor detects a human in front of a vehicle in a front-rear direction of the vehicle. Further, the image sensor detects a position of a head of the human, a relative speed of the head relative to the vehicle in a left-right direction of the vehicle, and a relative speed of the head relative to the vehicle in a perpendicular direction perpendicular to the front-rear direction and the left-right direction. The distance sensor detects a relative speed and a relative distance of the human, who is detected by the image sensor, relative to the vehicle in the front-rear direction. The first-collision predicting part determines if a possibility of a first collision, which happens between the human and the vehicle, is higher than a predetermined threshold based on a detection result of the image sensor and a detection result of the distance sensor. When the first-collision predicting part determines the possibility of the first collision is higher than the predetermined threshold, the first-collision-situation determining part determines a position of the head at a time of the first collision and a relative speed of the head relative to the vehicle. The first-collision-situation determining part determines the position of the head and the relative speed based on the detection result of the image sensor and the detection result of the distance sensor. The second-collision-situation estimating part estimates a collision situation of the head in a second collision, based on a determining result of the first-collision-situation determining part. The injury-degree predicting part predicts a degree of injury of the head based on an estimation result of the second-collision-situation estimating part.

According to the present disclosure, the impact-injury predicting system determines a head position at a time of the first collision and calculates the relative speed of the head relative to the vehicle. Based on such a determining result and a calculation result, the impact-injury predicting system can predict the degree of injury of the head. Therefore, the impact-injury predicting system can predict human injury caused in the second collision, which is a collision of the human with the vehicle or with the ground induced by the first collision.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Figure 1:
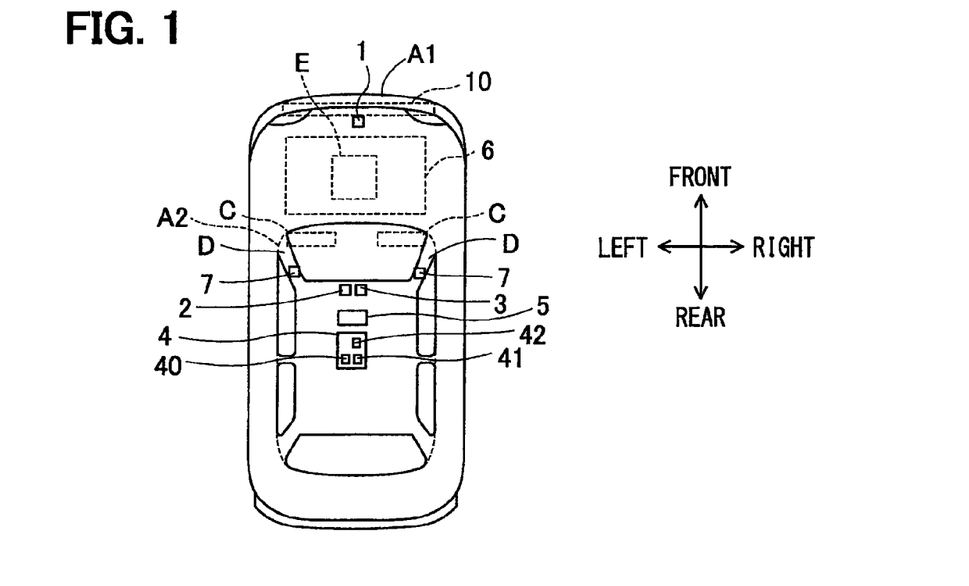
FIG. 1 is a configuration diagram illustrating an impact-injury predicting system predicting human injury in a car accident according to an embodiment.

An embodiment will be described hereinafter with reference to the accompanying conceptual drawings. As shown in FIG. 1, an impact-injury predicting system has a pressure sensor 1, an image sensor 2, a distance sensor 3, an air bag electronic control unit (an air bag ECU) 4, a wireless communication device 5, a pop-up hood 6, and a pillar air bag 7. The pressure sensor 1, the pop-up hood 6, and the pillar air bag 7 correspond to a collision-detecting sensor, a first protection device, and a second protection device, respectively.

The pressure sensor 1 detects a pressure in a chamber 10 disposed in a bumper A1 positioned at a front-end of a vehicle. The bumper A1 is located at a front part of the vehicle. Specifically, the pressure sensor 1 detects a pressure change in the chamber 10 and transmits the pressure change to the air bag ECU 4. The pressure sensor 1 is electrically connected to the air bag ECU 4 by a wiring. When a vulnerable road user such as a pedestrian and a person on a bicycle collides with the vehicle, the bumper A1 and the chamber 10 disposed inside the bumper A1 are deformed, and a pressure in the chamber 10 is increased. The pressure sensor 1 detects such a pressure change.

The image sensor 2 is located around a windshield inside a passenger compartment A2 of the vehicle. For example, the image sensor 2 is located at a rearview mirror to sense ahead of the vehicle in the front-rear direction and acquires an image in front of the vehicle. The image sensor 2 uses a coordinate system to detect a head of a human. In the coordinate system, a left-right direction of the vehicle corresponds to an extending direction of Y-axis, and a perpendicular direction of the vehicle (i.e., a top-bottom direction of the vehicle) corresponds to an extending direction of Z-axis. Specifically, the image sensor 2 detects the human and the head of the human and uses the coordinate system to determine a position of the head as a coordinate point (Y, Z). The image sensor 2 determines a relative speed of the head relative to the vehicle in the left-right direction and a relative speed of the head relative to the vehicle in the perpendicular direction, based on a shift in positions of the head shifting over time. The image sensor 2 is electrically connected to the air bag ECU 4 and transmits information to the air bag ECU 4. The information transmitted to the air bag ECU 4 includes the position of the head and the relative speed of the head relative to the vehicle both in the left-right direction and in the perpendicular direction. The air bag ECU 4 may determine the relative speed of the head relative to the vehicle instead of the image sensor 2, based on position information of the head.

Figure 3:
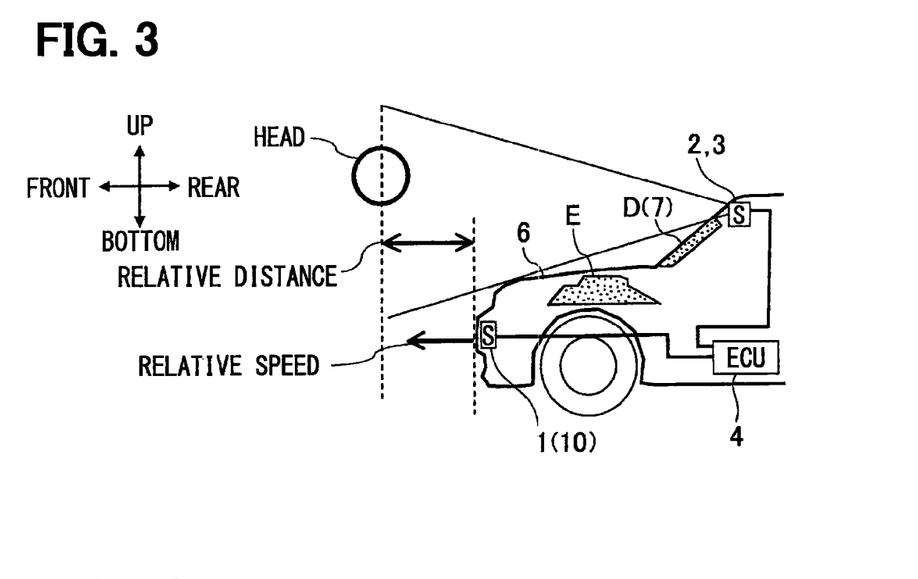
FIG. 3 is an explanatory view illustrating a collision prediction of the impact-injury predicting system.

The distance sensor 3 senses ahead of the vehicle by using a millimeter wave, laser, and the like. The distance sensor 3 detects a relative distance of the head (i.e., the human) relative to a tip of the bumper A1 (i.e., the vehicle) in the front-rear direction corresponding to an extending direction of X-axis of the coordinate system, as shown in FIG. 3. The distance sensor 3 also detects the relative speed of the head relative to the vehicle (e.g., the tip of the bumper A1) in the front-rear direction, as shown in FIG. 3. The distance sensor 3 is located adjacent to the image sensor 2. The distance sensor 3 is electrically connected to the air bag ECU 4 and transmits information including the relative distance and the relative speed to the air bag ECU 4. The air bag ECU 4 may determine the relative speed based on the relative distance detected by the distance sensor 3.

The air bag ECU 4 is an electric control unit carrying out an actuation control for an air bag C. The air bag C is an occupant protection device. The air bag ECU 4 is disposed in a vehicle, for example, in a space under an air-conditioner operating panel (not shown) not to be exposed in the passenger compartment A2. Further, the air bag ECU 4 is located generally at a center of the vehicle. Other in-vehicle electronic control units may be used as the air bag ECU 4.

The air bag ECU 4 includes a microcomputer 40 having an electronic circuit, an acceleration sensor 41, and an event data recorder 42. The acceleration sensor 41 is a gravity sensor (G sensor) detecting an acceleration of the vehicle in the front-rear direction and an acceleration of the vehicle in the left-right direction. A detection result of the acceleration sensor 41 is used to the actuation control for the air bag C. The event data recorder 42 is a non-volatile memory. When a collision is detected, or before or after the collision, the event data recorder 42 records data regarding the collision, such as a vehicle speed, a brake signal, and position information. The microcomputer 40 executes the actuation control for the air bag C based on the detection result of the acceleration sensor 41.

Figure 2:
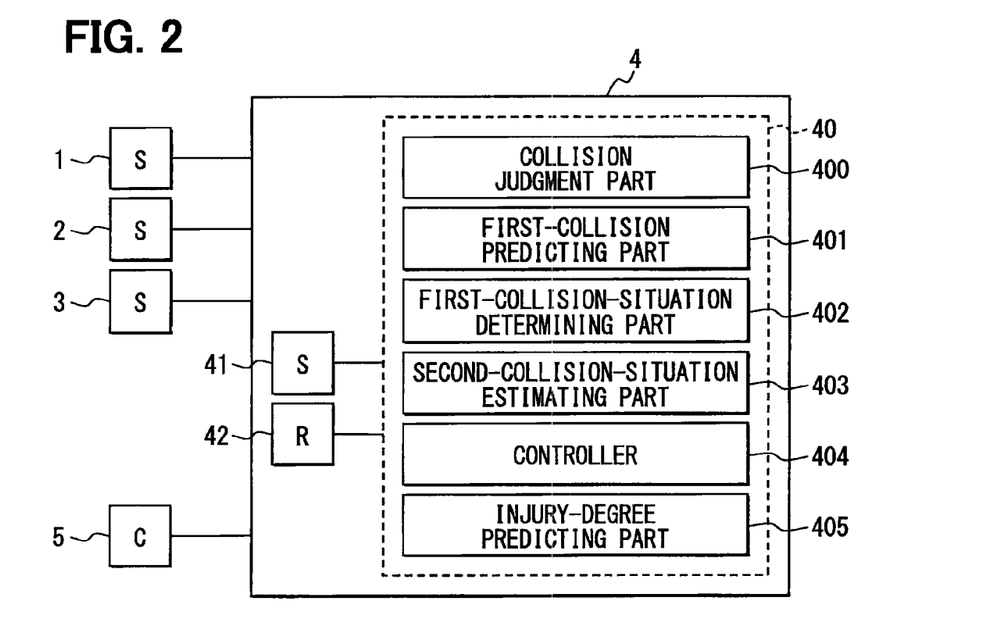
FIG. 2 is a block diagram illustrating the impact-injury predicting system.

As shown in FIG. 2, the air bag ECU 4 includes a collision judgment part 400, a first-collision predicting part 401, a first-collision-situation determining part 402, a second-collision-situation estimating part 403, a protection device controller 404, and an injury-degree predicting part 405. The air bag ECU 4 executes functions of the parts listed above.

The collision judgment part 400 determines occurrence of a collision based on a detection result of the pressure sensor 1. For example, the collision judgment part 400 stores a predetermined threshold thereon. When the detection result of the pressure sensor 1 exceeds the predetermined threshold, the collision judgment part 400 determines that a collision happens.

The first-collision predicting part 401 determines if a possibility of a first collision of a human (i.e., a vulnerable road user), who is detected by the image sensor 2, with a vehicle is higher than a predetermined threshold. According to this embodiment, the first-collision predicting part 401 determines the possibility based on a detection result of the image sensor 2 and a detection result of the distance sensor 3. The detection result of the image sensor 2 includes a location where the human is and the relative speed of the human relative to the vehicle in the left-right direction. The detection result of the distance sensor 3 includes a relative distance and the relative speed of the human relative to the vehicle in the front-rear direction. The first-collision predicting part 401 determines a possibility of a first collision based on the detection result of the image sensor 2 and the detection result of the distance sensor 3. For example, the first-collision predicting part 401 calculates a time period taken to the first collision by dividing a relative distance by a relative speed. The possibility of the first collision is determined from a relationship between the time period and the relative speed of the human relative to the vehicle in the left-right direction. The first-collision predicting part 401 determines the possibility of the first collision to be high or low based on the predetermined threshold.

Figure 4A:
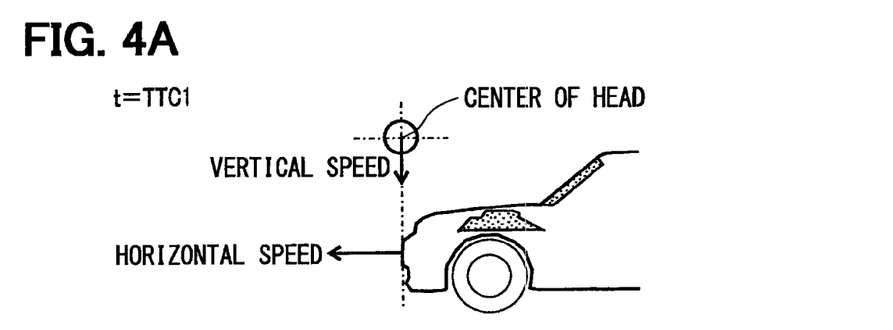
FIG. 4A is an explanatory view illustrating an estimation of a first collision situation.
Figure 4B:
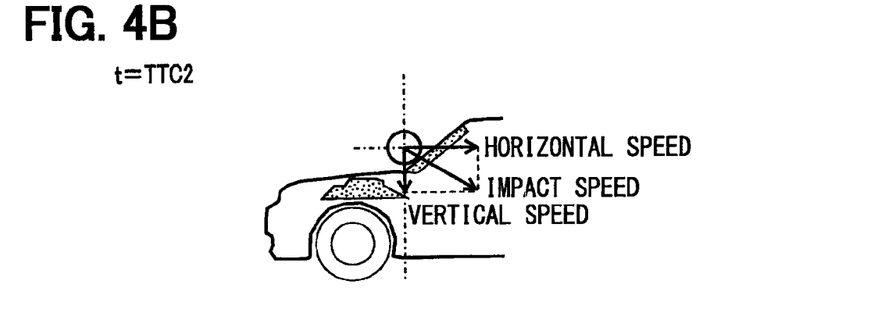
FIG. 4B is an explanatory view illustrating an estimation of a second collision situation.

When the first-collision predicting part 401 determines the possibility of the first collision is higher than the predetermined threshold, the first-collision-situation determining part 402 determines a position of the head and a relative speed of the head relative to the vehicle at a time of the first collision by an operation. The operation to calculate the position of the head and the relative speed of the head relative to the vehicle is executed based on information from the image sensor 2 and the distance sensor 3. As shown in FIGS. 3, 4A, and 4B, the position of the head and the relative speed of the head relative to the vehicle at the time of the first collision are predicted on the supposition that the relative speed of the head relative to the vehicle in the left-right direction and in the front-rear direction are maintained until the first collision. The relative speed of the head (e.g., a center of the head) relative to the vehicle at the time of the first collision is predicted by the first-collision predicting part 401.

When the first-collision predicting part 401 determines that the first collision happens, the first-collision-situation determining part 402 records the coordinate point (Y, Z) of the head and the relative speed of the head relative to the vehicle at the time of the first collision on an internal memory or the event recorder 42. The relative speed of the head relative to the vehicle is in the front-rear direction, in the left-right direction, and in the perpendicular direction. Alternatively, the relative speed of the head relative to the vehicle may be a combined (synthetic) speed in the front-rear direction, in the left-right direction, and in the perpendicular direction. According to this embodiment, the first-collision-situation determining part 402 determines a situation of the first collision before the collision judgment part 400 makes a determination.

The second-collision-situation estimating part 403 estimates a second-collision situation of the head with the vehicle based on a data (i.e., a determination result) from the first-collision-situation determining part 402. Specifically, the second-collision-situation estimating part 403 estimates a head-vehicle impact site, which is a location where the head collides with the vehicle, based on the judgment of the first-collision-situation determining part 402. The second-collision-situation estimating part 403 also estimates a head-vehicle impact speed, which is a speed of the head colliding to the vehicle, based on the determination result of the first-collision-situation determining part 402. Alternatively, the second-collision-situation estimating part 403 may calculate and estimate a head-ground impact site, which is a location where the head collides with the ground, instead of the head-vehicle impact site. The second-collision-situation estimating part 403 estimates the head-vehicle impact site based on factors such as the first-impact site of the head and the combined speed determined by the first-collision-situation determining part 402, a predetermined mass of the head, and gravity. When a location to where the head collides is determined to be on the vehicle, the second-collision-situation estimating part 403 estimates that the head collides with the vehicle in the second-collision. Subsequently, the second-collision-situation estimating part 403 further estimates the head-vehicle impact site and the head-vehicle impact speed. When a location to where the head collides is determined not to be on the vehicle, the second-collision-situation estimating part 403 determines that the head does not collide with the vehicle and estimates a head-ground impact speed, which is a speed of the head colliding to the ground.

According to this embodiment, the first-collision-situation determining part 402 determines the relative speed of the head relative to the vehicle in the front-rear direction and the relative speed of the head relative to the vehicle in the left-right direction. As shown in FIGS. 4A and 4B, a combined speed is calculated based on the relative speed in the front-rear direction and the relative speed in the left-right direction. The combined speed is hereinafter referred to as a horizontal speed. Alternatively, an actual (i.e., absolute) speed of the head in the front-rear direction and an actual speed of the head in the left-right direction may be combined. Further, a relative speed of the head relative to the vehicle in the perpendicular direction at a time of the second collision is calculated from the relative speed of the head relative to the vehicle in the perpendicular direction at the time of the first collision, in consideration of the mass of the head and the gravity. The relative speed of the head, relative to the vehicle in the perpendicular direction at the time of the second collision, is hereinafter referred to as a vertical speed. The second-collision-situation estimating part 403 estimates an impact speed, which is the head-vehicle impact speed or the head-ground impact speed at the time of the second collision, by combining the horizontal speed and the vertical speed.

Data about a shape of the vehicle is pre-stored on the second-collision-situation estimating part 403. The second-collision-situation estimating part 403 estimates a second-impact site, which is a location where the head collides with the vehicle or the ground in the second collision, by comparing the shape of the vehicle and the combined speed (i.e., the impact speed) of the head (see FIG. 5). Alternatively, the second-collision-situation estimating part 403 may estimate the second-impact site by comparing the shape of the vehicle and a trajectory of the head. When the second-collision-situation estimating part 403 determines that the second-collision of the head with the vehicle does not happen, the second-collision-situation estimating part 403 estimates the head-ground impact speed from factors such as the vertical speed of the head and the actual speed of the head in the left-right direction at the time of the collision (e.g., first collision). The vertical speed of the head is calculated in consideration of the mass of the head and the gravity. When the collision judgment part 400 judges the first collision happens, the second-collision-situation estimating part 403 determines that an estimation result of the second-collision-situation estimating part 403 about the second-collision situation is effective. The estimation result about the second-collision situation is recorded on the internal memory. Alternatively, the estimation result about the second-collision situation is recordable on the event data recorder 42, for example, when the event data recorder 42 is available.

The protection device controller 404 carries out an operation control for controlling an operation of a head protection device, which protects the head from a collision impact. The head protection device is, in other words, a pedestrian protection device such as the pop-up hood 6 disposed in the front part of the vehicle and the pillar air bag 7. When the collision judgment part 400 judges that a collision happens, the protection device controller 404 transmits a command signal to actuate the pop-up hood 6 and the pillar air bag 7, selectively. The command signal is based on the estimation result of the second-collision-situation estimating part 403. Specifically, when the second-collision-situation estimating part 403 estimates that the second-impact site is on a hood of the vehicle, the protection device controller 404 actuates the pop-up hood 6. Alternatively, when the second-impact site of the head is estimated to be the hood (directly above the engine E), the protection device controller 404 may also actuate the pop-up hood 6. When the second-collision-situation estimating part 403 estimates that the second-impact site is on a pillar D located in a front part of the vehicle (e.g., an A-pillar), the protection device controller 404 actuates the pillar air bag 7. The pop-up hood 6 absorbs a collision impact by popping-up an engine hood. The pillar air bag 7 absorbs a collision impact by deploying an air bag toward the front of the pillar D.

The injury-degree predicting part 405 predicts a degree of pedestrian impact injuries based on an estimation result of the second-collision-situation estimating part 403 and a control result of the protection device controller 404. Further, according to this embodiment, an injury degree map, which shows a relationship between a degree of injury and a collision situation (i.e., an impact site and an impact speed of the head) is pre-stored on a non-volatile memory (not shown). The injury-degree predicting part 405 predicts a degree of injury by using the injury degree map.

Figure 5:
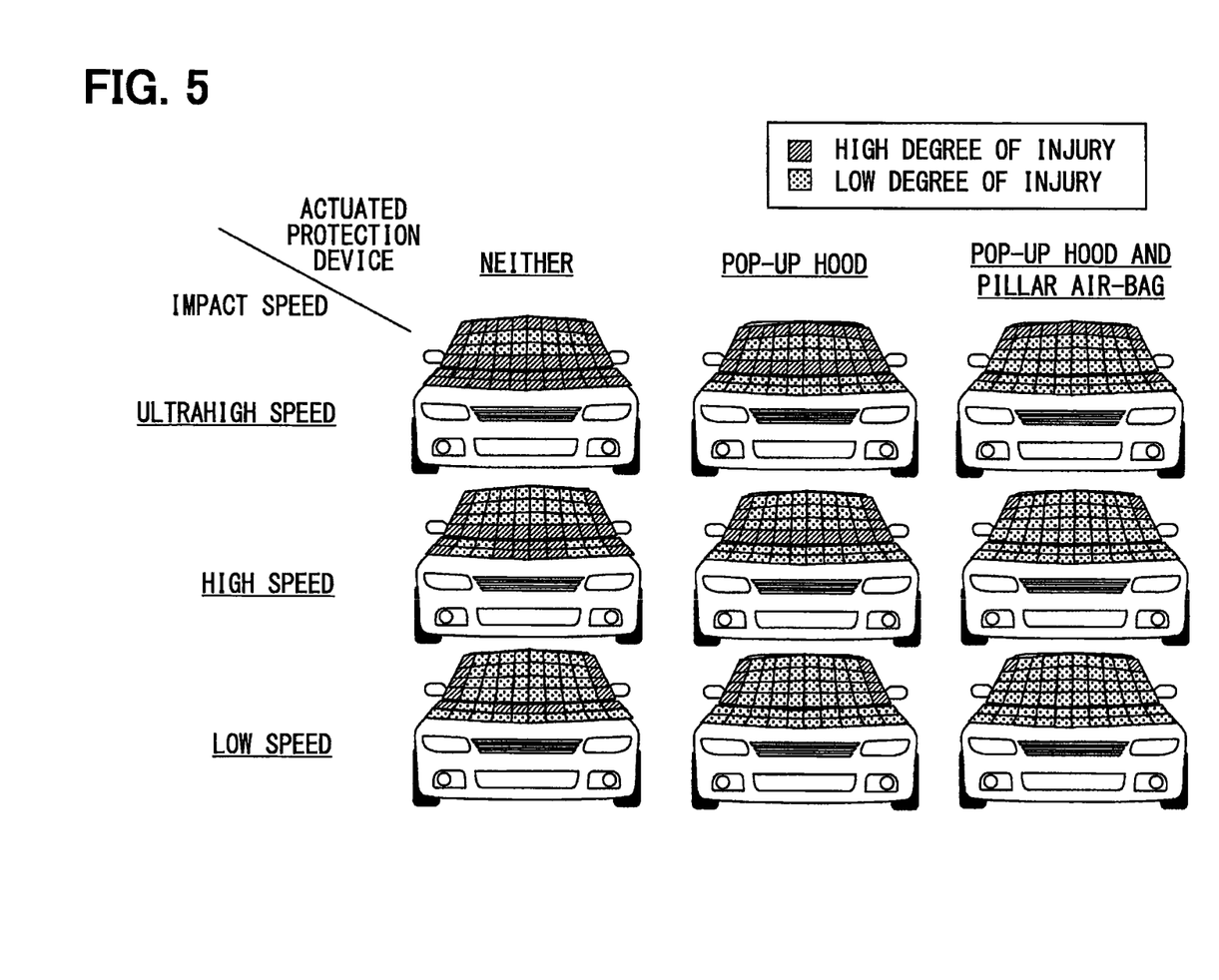
FIG. 5 is a view illustrating an injury degree map.

As shown in FIG. 5, the injury degree map shows the head-vehicle impact speed, presence or absence of actuation of the pop-up hood 6 and the pillar air bag 7, and the degree of injury relative to the second-impact site of the head. The head-vehicle impact speed is shown on a scale of ultrahigh speed, high speed, and low speed. The degree of injury is shown on a scale of high and low. The injury-degree predicting part 405 determines the degree of injury by applying the second-impact site, the head-vehicle impact speed, and the control result of the protection device controller 404 to the injury degree map. The degree of injury is pre-determined to be high at a location having a high stiffness, for example, at a disposing location of the engine E, at a disposing location of the pillar D, along both sides of the hood in the left-right direction, and on a frame of a windshield. The degree of injury is changeably set depending on what protection devices are actuated.

When the second-collision-situation estimating part 403 determines that the second collision of the head with the vehicle does not happen, the injury-degree predicting part 405 predicts a degree of injury based on the head-ground impact speed estimated by the second-collision-situation estimating part 403. In this case, the injury-degree predicting part 405 determines if the degree of injury is high or low by comparing the head-ground impact speed with a predetermined threshold of a degree of injury according to the head-ground impact speed. When the head-ground impact speed is faster than the predetermined threshold, the degree of injury is determined to be high.

The protection device controller 404 actuates the pop-up hood 6 and the pillar air bag 7 based on the estimation result of the second-collision-situation estimating part 403. Therefore, the injury-degree predicting part 405 may predict the degree of injury based on only the estimation result of the second-collision-situation estimating part 403 without considering the control result of the protection device controller 404. That is, the injury-degree predicting part 405 may make reference the injury degree map on the supposition that the pop-up hood 6 and the pillar air bag 7 are actuated. The injury-degree predicting part 405 is not limited to predict a degree of injury after the collision judgment part 400 judges a collision happens, and may predict a degree of injury before the collision judgment part 400 judges a collision happens. The protection devices may be actuated when the protection device controller 404 detects a predetermined collision impact regardless of the estimation result of the second-collision-situation estimating part 403. In such a case, the injury-degree predicting part 405 predicts a degree of injury on the supposition that all protection devices (i.e., both of the pop-up hood 6 and the pillar air bag 7) are actuated.

The injury-degree predicting part 405 predicts a degree of injury after the collision judgment part 400 judges a collision happens. The injury-degree predicting part 405 subsequently records the degree of injury and commands the wireless communication device 5 to report the collision to a predetermined institution.

The wireless communication device 5 is a device, which enables a telephone call and a data communication externally with the predetermined institution by wireless communication. According to this embodiment, a communication electric control unit (a communication ECU) is employed as the wireless communication device 5. The predetermined institution is, for example, a vehicle operation center, which is an operation service institution of a vehicle maker or the like, a fire department, and an emergency hospital having a helicopter for an emergency medical service. The wireless communication device 5 reports the collision together with accident information (e.g., information stored on the event data recorder 42) including the degree of injury to the predetermined institution.

An operation flow of the predicting system according to this embodiment will be described below.

Figure 6A:
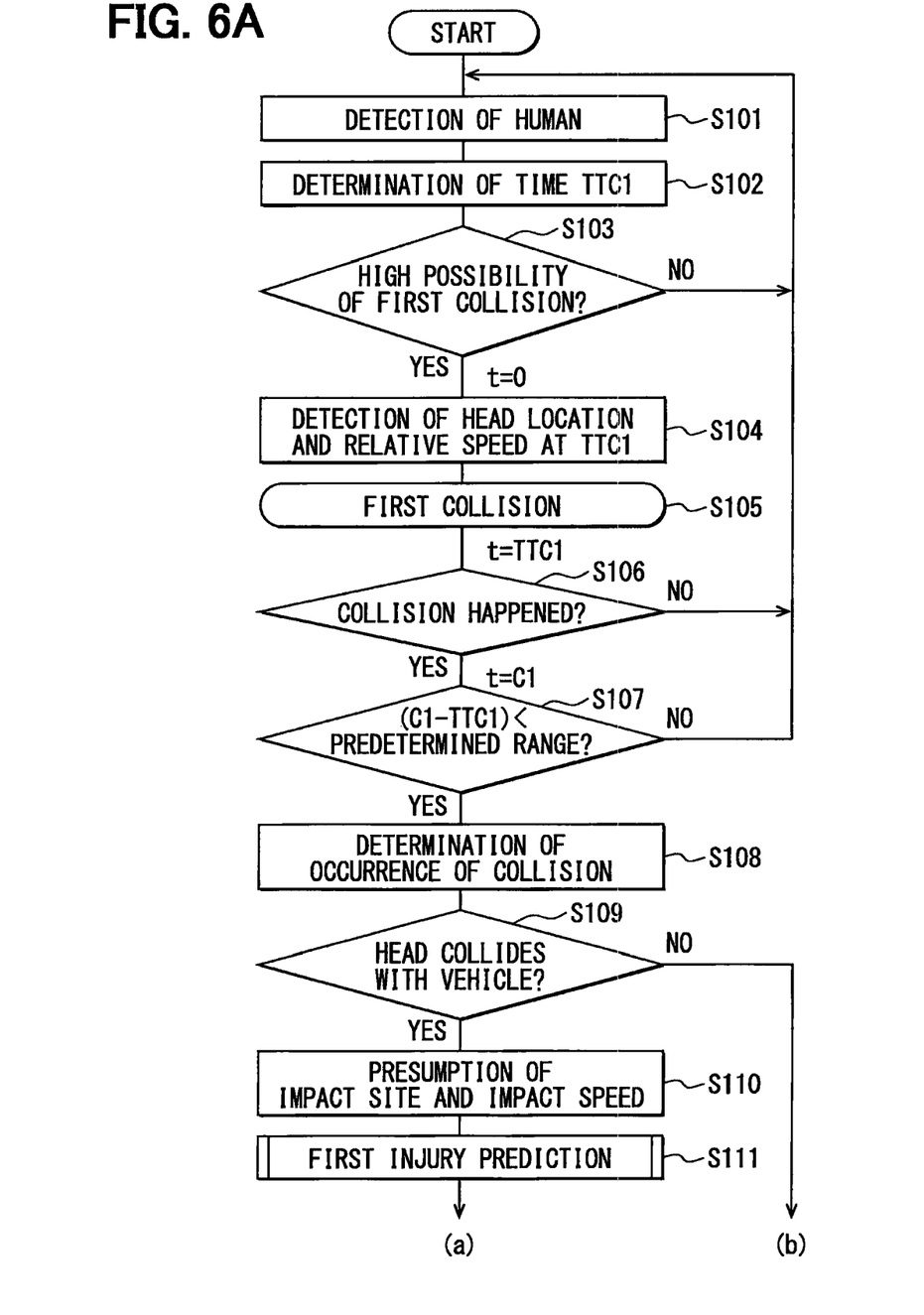
FIG. 6A is a flowchart explaining a first injury prediction executed by the impact-injury predicting system.

As shown in FIG. 6A, the image sensor 2 detects a pedestrian (or a person on a bicycle) (i.e., a vulnerable road user) in front of the vehicle in the driving direction during a driving time of the vehicle, at S101. The distance sensor 3 detects a relative speed and a relative distance of the pedestrian relative to the vehicle. The distance sensor 3 or the air bag ECU 4 subsequently determines a time period TTC1 taken to the first collision of the pedestrian with the vehicle at S102. The air bag ECU 4 determines if possibility of the first collision is higher than the predetermined threshold or not, based on the relative speed and the relative distance at S103.

A point, where the air bag ECU 4 determines the possibility of the first collision is higher than the predetermined threshold (S103: YES), is defined as a starting point (t=0) of a timing measurement. When the collision judgment part 400 judges that a collision happens, the timing measurement is finished. A point at which the timing measurement is finished is defined as a time C1.

The first-collision-situation determining part 402 estimates and determines a position of the head and a relative speed of the head relative to the vehicle at the time TTC1 (FIG. 4A), based on a detection result of the image sensor 2 and a detection result of the distance sensor 3, at S104. When a collision happens, the pressure sensor 1 detects the pressure change caused by the collision at S105. The collision judgment part 400 subsequently judges if the collision happens or not at S106.

When the collision judgment part 400 judges the collision happens (S106: YES), the timing measurement is stopped (t=C1). The time TTC1 is compared with the time C1 at S107. When a time difference between the time TTC1 and the time C1 is within a predetermined range (S107: YES), the collision detected by the pressure sensor 1 is determined to likely involve with the pedestrian detected by the image sensor 2 and the distance sensor 4. Estimation of a second collision of the head is started subsequently at S108.

The second-collision-situation estimating part 403 estimates presence or absence of the second collision of the head with the vehicle based on the position of the head and the relative speed of the head relative to the vehicle at the time TTC1 estimated by the first-collision-situation determining part 402, at S109. When the second-collision-situation estimating part 403 estimates the second collision happens (S109: YES), the second-collision-situation estimating part 403 subsequently estimates a second-impact site and a head-vehicle impact speed, which is a speed of the head relative to the vehicle at a time TTC2 (FIG. 4B), at S110. The time TTC2 is a point where the second collision of the head with the vehicle happens. The injury-degree predicting part 405 predicts a degree of injury from the injury degree map without actuating the pop-up hood 6 and the pillar air bag 7 at S111, based on an estimation result of the second-collision-situation estimating part 403. This prediction of the injury at S111 is hereinafter referred to as a first injury prediction and is shown in FIG. 6A.

Figure 6B:
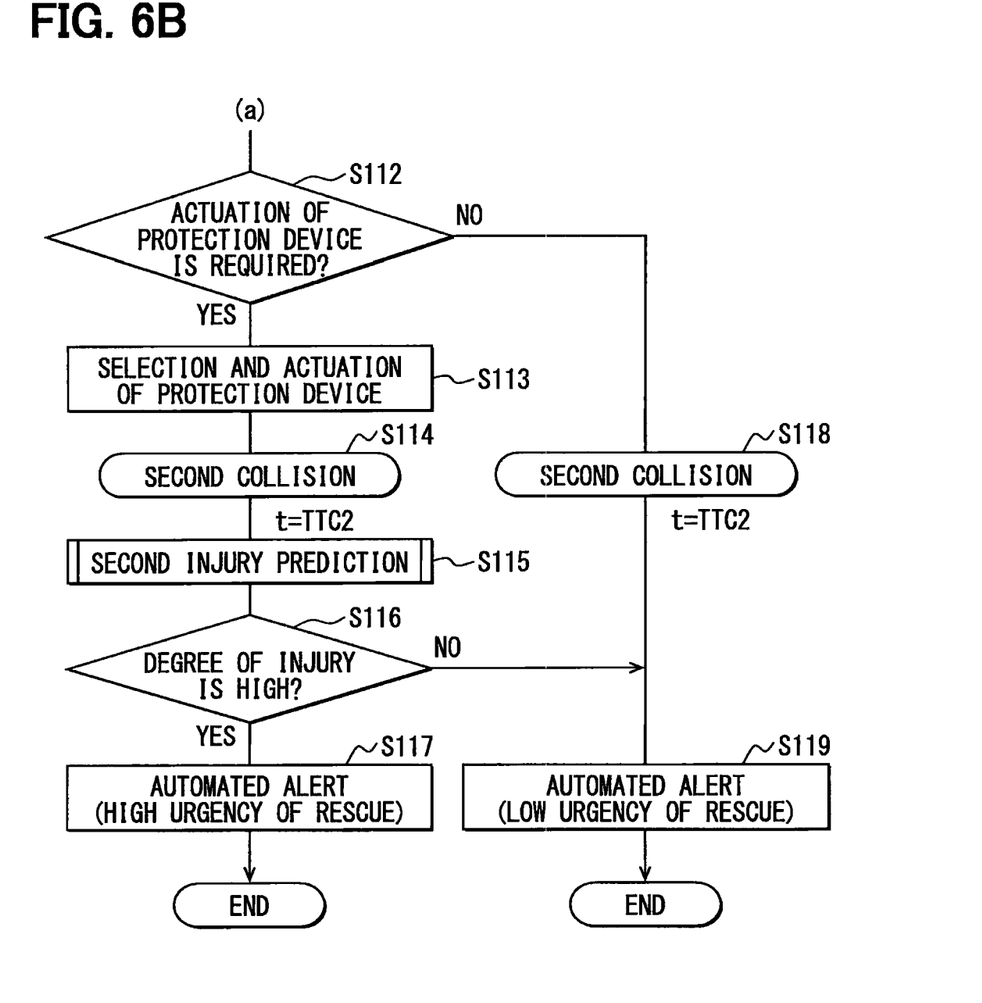
FIG. 6B is a flowchart explaining a second injury prediction executed by the impact-injury predicting system.

As shown in FIG. 6B, at S112, based on the estimation result of the second-collision-situation estimating part 403, the protection device controller 404 determines if actuation of the pop-up hood 6 and the pillar air bag 7 is necessary. When the protection device controller 404 determines the actuation of the pop-up hood 6 and the pillar air bag 7 is necessary (S112: YES), the protection device controller 404 actuates the pop-up hood 6 and/or the pillar air bag 7, selectively at S113. When the second collision is detected at S114, the injury-degree predicting part 405 predicts the degree of injury by using the injury degree map in consideration of presence or absence of actuation of the pop-up hood 6 and the pillar air bag 7 at S115. This prediction of the degree of injury at S115 is hereinafter referred to as a second injury prediction and is shown in FIG. 6B.

When the degree of injury is predicted to be likely to be high from a prediction result of the second injury prediction (S116: YES), the wireless communication device 5 automatically reports that urgency of a rescue work is high, at S117. On the other hand, when the degree of injury is predicted to be likely to be low (S116: NO), the wireless communication device 5 automatically reports that urgency of a rescue work is relatively low, at S119. The wireless communication device 5 reports such demand of the urgent rescue work together with information about the degree of injury.

When the actuation of the pop-up hood 6 and the pillar air bag 7 is determined to be unnecessary (S112: NO), after the second collision is generated (after the time TTC2) at S118, the wireless communication device 5 automatically reports that urgency of a rescue work is relatively low, at S119. In this case, the wireless communication device 5 reports such demand of the urgent rescue work together with information about the degree of injury predicted in the first injury prediction.

Figure 6C:
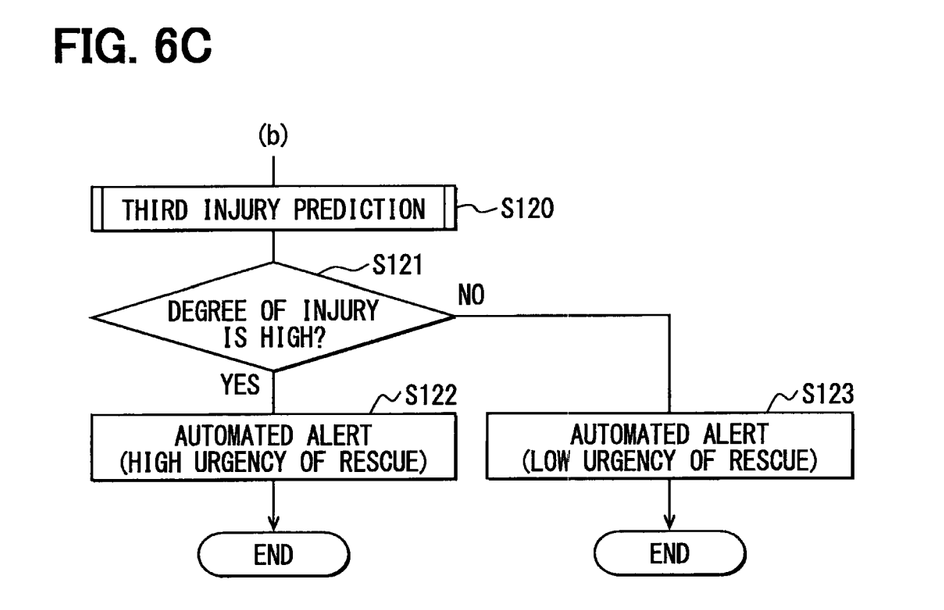
FIG. 6C is a flowchart explaining a third injury prediction executed by the impact-injury predicting system.

As shown in FIG. 6C, when the second-collision-situation estimating part 403 determines that there is no possibility of the second collision of the head with the vehicle (S109: NO), the injury-degree predicting part 405 predicts a degree of injury caused in a collision of the head with the ground, at S120. This prediction of the degree of injury caused in the collision of the head with the ground is hereafter referred to as a third injury prediction and is shown in FIG. 6C. When the degree of injury is predicted to be likely to be high from a prediction result of the third injury prediction (S121: YES), the wireless communication device 5 automatically reports that urgency of a rescue work is high, at S122. On the other hand, when the degree of injury is predicted to be likely to be low (S121: NO), the wireless communication device 5 automatically reports that urgency of a rescue work is low together with a prediction result of the third injury prediction at S123.

According to this embodiment, when there is high possibility of a first collision of a human (i.e., a vulnerable road user) with a vehicle, a position of a head of the human and a relative speed of the head relative to the vehicle at a time of the first collision are estimated. When a second collision is predicted to happen after the first collision, a second-collision situation is estimated based on the position of the head and the relative speed of the head. Subsequently, a degree of injury is predicted based on the second-collision situation. Therefore, the degree of injury can be predicted in consideration of the second collision of the human with the vehicle or with the ground. Further, according to this embodiment, the second-collision-situation estimating part 403 estimates a second impact site where the head collides to the vehicle in the second collision and a second impact speed at which the head collides to the vehicle in the second collision. Thus, a prediction of the degree of injury can be accurate.

According to this embodiment, the protection device controller 404 selectively actuates the pop-up hood 6 and the pillar air bag 7 based on an estimation result of the second-collision-situation estimating part 403. Therefore, the pop-up hood 6 and the pillar air bag 7 can be restricted from actuating unnecessarily, and vehicle repair cost can be reduced. Further, the injury-degree predicting part 405 predicts the degree of injury in consideration of presence or absence of actuation of the pop-up hood 6 and the pillar air bag 7. Thus, the prediction of the degree of injury can be accurate.

According to this embodiment, when a collision is detected, the wireless communication device 5 automatically reports the collision together with the degree of injury, which is predicted by the injury-degree predicting part 405, to a predetermined institution. Therefore, the predetermined institution can carry out a definite and prompt rescue work based on the degree of injury or urgency of rescue. Further, even when the second-collision-situation estimating part 403 estimates that the head does not collide with the vehicle in the second collision, the second-collision-situation estimating part 403 estimates a head-ground impact speed in the second collision. Subsequently, the injury-degree predicting part 405 can predict a degree of injury caused by a collision of the head with the ground. Thus, the injury-degree predicting part 405 can predict the degree of injury in consideration of a collision situation of the second collision, which is induced by the first collision. The wireless communication device 5 automatically reports the collision together with the degree of injury, and the predetermined institution can carry out a definite and prompt rescue work.

The present disclosure is not limited to this embodiment. An acceleration sensor (e.g., a gravity sensor), which detects an acceleration in the front-rear direction corresponding to the extending direction of X-axis, may be used as a sensor detecting a collision. The air bag ECU 4 may carry out an arithmetic processing, which is carried out by the image sensor 2 and the distance sensor 3 in this embodiment. When a vehicle does not have the pop-up hood 6 and the pillar air bag 7, the protection device controller 404 is unnecessary. In such a case, the injury degree map may be a version which is unrelated to neither the pop-up hood 6 nor the pillar air bag 7, or in which neither the pop-up hood 6 nor the pillar air bag 7 are actuated.

The first-collision-situation determining part 402 may judge a position of the head and a relative speed of the head relative to the vehicle at a time of the first collision, based on a detecting result of the image sensor 2 and a detecting result of the distance sensor 3. The detection result of the image sensor 2 and the detection result of the distance sensor 3 are detected at a time when the collision judgment part 400 judges a collision happens. In this case, the first-collision-situation determining part 402 determines, instead of estimating, an actual detected value of the image sensor 2 and an actual detected value of the distance sensor 3 as a collision situation of the first collision.

Such changes and modifications are to be understood as being within the scope of the present disclosure as defined by the appended claims.

What is claimed is:

1. An impact-injury predicting system, comprising:
   an image sensor detecting a human in front of a vehicle in a front-rear direction of the vehicle, wherein the image sensor detects a position of a head of the human, a relative speed of the head relative to the vehicle in a left-right direction of the vehicle, and a relative speed of the head relative to the vehicle in a perpendicular direction perpendicular to the front-rear direction and the left-right direction;
   a distance sensor detecting a relative speed and a relative distance of the human, who is detected by the image sensor, relative to the vehicle in the front-rear direction;
   a first-collision predicting part determining whether a possibility of a first collision, which happens between the human and the vehicle, is higher than a predetermined threshold based on a detection result of the image sensor and a detection result of the distance sensor;

a first-collision-situation determining part determining a position of the head and a relative speed of the head relative to the vehicle at a time of the first collision based on the detection result of the image sensor and the detection result of the distance sensor, when the first-collision predicting part determines the possibility of the first collision is higher than the predetermined threshold;

a second-collision-situation estimating part estimating a collision situation of the head in a second collision, based on a determining result of the first-collision-situation determining part; and an injury-degree predicting part predicting a degree of injury of the head based on an estimation result of the second-collision-situation estimating part.

2. The impact-injury predicting system according to claim 1, wherein
the second-collision-situation estimating part estimates an impact site of the head with the vehicle and an impact speed of the head relative to the vehicle at the time of the second collision.

3. The impact-injury predicting system according to claim 1, further comprising:
a collision-detecting sensor detecting a collision of the vehicle; and
a collision determining part determining whether a collision happens or not based on a detection result of the collision-detecting sensor, wherein
the second-collision-situation estimating part determines that the estimation result of the second-collision-situation estimating part is effective, when the collision determining part determines the collision of the vehicle.

4. The impact-injury predicting system according to claim 1, further comprising:
a collision-detecting sensor detecting a collision of the vehicle;
a collision determining part determining whether a collision happens or not based on a detection result of the collision-detecting sensor;
a first protection device mounted in a front part of the vehicle to absorb an impact of a collision between the human and an internal combustion engine of the vehicle;
a second protection device mounted in a front part of the vehicle to absorb an impact of a collision between the human and a pillar of the vehicle; and
a protection device controller selectively actuates the first protection device or the second protection device based on the estimation result of the second-collision-situation estimating part, when the collision determining part determines the collision of the vehicle.

5. The impact-injury predicting system according to claim 4, wherein
the injury-degree predicting part predicts the degree of injury of the head based on the estimation result of the second-collision-situation estimating part and a control result of the protection device controller.

6. The impact-injury predicting system according to claim 1, further comprising:
a collision-detecting sensor detecting a collision of the vehicle;
a collision determining part determining whether a collision happens or not based on a detection result of the collision-detecting sensor; and a wireless communication device reporting a prediction result of the injury-degree predicting part to an institution, when the collision determining part determines the collision of the vehicle.

7. The impact-injury predicting system according to claim 1, wherein
the second-collision-situation estimating part estimates an impact speed of the head relative to ground, when the second-collision-situation estimating part estimates that the second collision does not happen between the head and the vehicle.

8. An impact-injury predicting system, comprising:
a first sensor detecting a human in front of a vehicle in a front-rear direction of the vehicle, the first sensor detecting a relative distance and a relative speed of the human relative to the vehicle;
a second sensor detecting a collision of the human with the vehicle;
a collision determining part determining whether a collision happens or not based on a detection result of the second sensor;
a first-collision predicting part determining whether a possibility of a first collision that happens between the human and the vehicle is higher than a predetermined threshold based on a detection result of the first sensor;
a first-collision-situation determining part determining a position of the human and a relative speed of the human relative to the vehicle at a time of the first collision based on the detection result of the first sensor, when the first-collision predicting part determines the possibility of the first collision is higher than the predetermined threshold; and
a second-collision-situation estimating part estimating an impact site of a head of the human with the vehicle and determining whether the head collides with the vehicle in a second-collision based on a determination result of the first-collision-situation determining part.

9. The impact-injury predicting system according to claim 8, further comprising:
a protection device absorbing an impact of a collision between the human and the vehicle; and
a protection device controller operating the protection device based on the impact site estimated by the second-collision-situation estimating part.

10. The impact-injury predicting system according to claim 8, wherein
the first sensor has:
an image sensor detecting where the human is positioned in front of the vehicle; and
a distance sensor detecting the relative speed and the relative distance of the human relative to the vehicle.

11. An impact-injury predicting system, comprising:
a first sensor detecting a human in front of a vehicle in a front-rear direction of the vehicle, the first sensor detecting a relative distance and a relative speed of the human relative to the vehicle;
a second sensor detecting a collision of the human with the vehicle;
a collision determining part determining whether a collision happens or not based on a detection result of the second sensor;
a first-collision predicting part determining whether a possibility of a first collision that happens between the human and the vehicle is higher than a predetermined threshold based on a detection result of the first sensor;
a first-collision-situation determining part determining a position of the human and a relative speed of the human relative to the vehicle at a time of the first collision based on the detection result of the first sensor, when the collision determining part determines that a collision happens; and a second-collision-situation estimating part estimating an impact site of a head of the human with the vehicle and determining whether the head collides with the vehicle in a second-collision based on a determination result of the first-collision-situation determining part.

12. The impact-injury predicting system according to claim 11, further comprising:

a protection device absorbing an impact of a collision between the human and the vehicle; and a protection device controller operating the protection device based on the impact site estimated by the second-collision-situation estimating part.

13. The impact-injury predicting system according to claim 11, wherein the first sensor has:

an image sensor detecting where the human is positioned in front of the vehicle; and a distance sensor detecting the relative speed and the relative distance of the human relative to the vehicle.

* * * * *